(12) United States Patent
Wang et al.

(10) Patent No.: US 11,403,879 B2
(45) Date of Patent: Aug. 2, 2022

(54) METHOD AND APPARATUS FOR CHILD STATE ANALYSIS, VEHICLE, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Fei Wang, Beijing (CN); Keyu Chen, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 18 days.

(21) Appl. No.: 16/884,204

(22) Filed: May 27, 2020

(65) Prior Publication Data
US 2020/0285842 A1    Sep. 10, 2020

Related U.S. Application Data

(63) Continuation of application No. PCT/CN2019/109443, filed on Sep. 30, 2019.

(30) Foreign Application Priority Data

Oct. 19, 2018    (CN) .......................... 201811224784.0

(51) Int. Cl.
*G06V 40/16*    (2022.01)
*G06K 9/62*    (2022.01)
*G06N 3/08*    (2006.01)

(52) U.S. Cl.
CPC .......... *G06V 40/172* (2022.01); *G06K 9/6255* (2013.01); *G06K 9/6256* (2013.01);
(Continued)

(58) Field of Classification Search
CPC .......... G06K 9/00288; G06K 9/00268; G06K 9/00302; G06K 9/6255; G06K 9/6256; G06N 3/08
(Continued)

(56) References Cited

U.S. PATENT DOCUMENTS 8,850,597 B1 *    9/2014    Gates .................. G06Q 10/103
                                                            726/26
2006/0045352 A1 *    3/2006    Gallagher ............ G06K 9/0061
                                                            382/224
(Continued)

FOREIGN PATENT DOCUMENTS

CN    106447625 A    2/2017
CN    106529402 A    3/2017
(Continued)

OTHER PUBLICATIONS

Written Opinion of the Singaporean application No. 11202004944P, dated May 31, 2021, 8 pgs.
(Continued)

*Primary Examiner* — Mark Roz
(74) *Attorney, Agent, or Firm* — Cooper Legal Group, LLC (57) ABSTRACT

A method and for child state analysis, a vehicle, an electronic device, and a storage medium are provided. The method includes: performing face feature extraction on at least one image frame in an obtained video stream; classifying whether a person in the image is a child and at least one state of the person according to face features to obtain a first classification result of whether the person in the image is a child, and a second classification result of the at least one state of the person; outputting the first classification result and the second classification result; and/or outputting
(Continued)

prompt information according to the first classification result and the second classification result.

16 Claims, 3 Drawing Sheets

(52) U.S. Cl.
CPC ............ *G06N 3/08* (2013.01); *G06V 40/168* (2022.01); *G06V 40/174* (2022.01)
(58) Field of Classification Search
USPC ........................................................ 382/118
See application file for complete search history.

(56) References Cited

U.S. PATENT DOCUMENTS

| | | | |
|---|---|---|---|
| 2009/0027188 A1* | 1/2009 | Saban .................... | B60N 2/002 340/521 |
| 2009/0127283 A1* | 5/2009 | Smith .................. | G06K 19/073 222/25 |
| 2014/0137324 A1* | 5/2014 | Doering ................... | A47D 9/00 5/93.1 |
| 2015/0379362 A1 | 12/2015 | Calmes et al. | |
| 2019/0320974 A1* | 10/2019 | Alzamzmi ........... | A61B 5/0077 |
| 2021/0179117 A1* | 6/2021 | Glazman ............ | B60H 1/00742 |

FOREIGN PATENT DOCUMENTS

| | | |
|---|---|---|
| CN | 106985750 A | 7/2017 |
| CN | 107644213 A | 1/2018 |
| CN | 107704838 A | 2/2018 |
| CN | 108492404 A | 9/2018 |
| CN | 108492404 B | 10/2020 |
| JP | 2011070623 A | 4/2011 |

OTHER PUBLICATIONS

"Heterogeneous Face Attribute Estimation: A Deep Multi-Task Learning Approach",Nov. 2018, Hu Han, Anil K. Jain, Fang Wang, Shiguang Shan and Xilin Chen, IEEE Transactions on Pattern Analysis and Machine Intelligence, vol. 40, No. 11, pp. 2-16.

First Office Action of the Japanese application No. 2020-528457, dated Jul. 6, 2021, 8 pgs.
"Application of Deep Learning for Infant Vomiting and Crying Detection", May 2018, Chuan-Yu Chang and Fu Ren Chen, 32nd International Conference on Advanced Information Networking and Applications Workshops, (WAINA), IEEE, 1 pp. 633-635.
"Video-based Discomfort Detection for Infants", Aug. 2018, Ye Sun, Caifeng Shan, Tao Tan, Xi Long, Arash Pourtaherian, Svitlana Zinger and Peter H.N. De With, Machine Vision and Applications, vol. 30, No. 5, pp. 933-944.
Supplementary European Search Report in the European application No. 19872846.1, dated Jul. 12, 2021, 9 pgs.
"Imagenet Classification with Deep Convolutional Neural Networks"; Jun. 2017, Alex Krizhevsky, Ilya Sutskever and Geoffrey E. Hinton; Proceedings of the 25th International Conference on Neural Information Processing Systems, vol. 60, No. 6; pp. 84-90.
"ImageNet: A Large-Scale Hierarchical Image Database"; Jun. 2009; Jia Deng, Wei Dong, Richard Socher, Li=Jia Li Lai Le and Li Fei-Fei; IEEE Conference on Computer Vision and Pattern Recognition, 8 pgs.
"Going deeper with convolutions"; Sep. 2014; Christian Szegedy, Wei Liu; Yangqing Jia, Pierre Sermanet, Scott Reed, Dragomir Angeuelov, Dumitru Erhan, Vincent Vanhoucke and Andrew Rabinovich, Proceedings of the IEEE Conference on Computer Vision and Pattern Recognition, 12 pgs.
"DeepFace: Closing the Gap to Human-Level Performance in Face Verification"; 2914; Yanivtaigman, Ming Yang, Mard' Aurelio Ranzato and Lior Wolf; IEEE Conference on Computer Vision and Pattern Recognition IEEE Computer Society, 8 pgs.
"Large-Margin Softmax Loss for Convolutional Neural Networks"; 2016; Weiyang Liu, Yandong Wen, Zhiding Yu and Meng Yang; Proceedings of the 33rd International Convference on Machine Learning; 10 pgs.
"Inception-v4, Inception-ResNet and the Impact of Residual Connections on Learning"; Feb. 2016; Christian Szegedy, Sergey Ioffe, Vincent Vanhoucke and Alex Alemi, Computer Vision and Pattern Recognition, 12 pgs.
"Deep Residual Learning for Image Recognition"; Dec. 2015; Kaiming He, Xiangyu Zhang, Shaoqing Ren and Jian Sun; Computer Fision and Pattern Recognition, 12 pgs.
International Search Report in the international application No. PCT/CN2019/109443, dated Jan. 6, 2020, 2 pgs.
First Office Action of the Korean application No. 10-2020-7014793, dated Oct. 8, 2021, 19 pgs.

* cited by examiner

METHOD AND APPARATUS FOR CHILD STATE ANALYSIS, VEHICLE, ELECTRONIC DEVICE, AND STORAGE MEDIUM

CROSS-REFERENCE TO RELATED APPLICATIONS

The present application is a continuation of International Patent Application No. PCT/CN2019/109443, filed on Sep. 30, 2019, which claims priority to Chinese Patent Application No. 201811224784.0, filed on Oct. 19, 2018. The disclosures of International Patent Application No. PCT/CN2019/109443 and Chinese Patent Application No. 201811224784.0 are hereby incorporated by reference in their entireties.

BACKGROUND

In recent years, in the field of computer visions, deep learning has been widely applied in image classification, positioning, segmentation, recognition and other tasks, and has achieved excellent results. Deep learning has also achieved great success in face-related work. For example, an existing technology makes the face recognition rate of a machine close to that of a human being through 3D face alignment, a siamese network, local convolution, and a large amount of training data.

SUMMARY

The present disclosure relates to computer vision technologies, and in particular, to a method and an apparatus for child state analysis, a vehicle, an electronic device, and a storage medium.

Embodiments of the present disclosure provide a child state analysis technology.

A method for child state analysis provided according to a first aspect of the embodiments of the present disclosure includes:

performing face feature extraction on at least one image frame in an obtained video stream;

classifying whether a person in the at least one image frame is a child and at least one state of the person according to face features to obtain a first classification result of whether the person in the at least one image frame is a child, and a second classification result of the at least one state of the person; and outputting the first classification result and the second classification result; and/or outputting prompt information according to the first classification result and the second classification result.

An apparatus for child state analysis provided according to a second aspect of the embodiments of the present disclosure includes:

a feature extraction unit, configured to perform face feature extraction on at least one image frame in an obtained video stream;

a classification unit, configured to classify whether a person in the at least one image frame is a child and at least one state of the person according to face features to obtain a first classification result of whether the person in the at least one image frame is a child, and a second classification result of the at least one state of the person; and a result output unit, configured to output the first classification result and the second classification result; and/or output prompt information according to the first classification result and the second classification result.

A vehicle provided according to a third aspect of the embodiments of the present disclosure includes: the apparatus for child state analysis according to any one of the foregoing embodiments.

An electronic device provided according to a fourth aspect of the embodiments of the present disclosure includes a processor, where the processor includes the apparatus for child state analysis according to any one of the foregoing embodiments.

An electronic device provided according to a fifth aspect of the embodiments of the present disclosure includes: a memory, configured to store executable instructions; and a processor, configured to communicate with the memory to execute the executable instructions so as to complete the method for child state analysis according to any one of the foregoing embodiments.

A computer storage medium provided according to a sixth aspect of the embodiments of the present disclosure is configured to store computer readable instructions, where when the instructions are executed, operations of the method for child state analysis according to any one of the foregoing embodiments are executed.

A computer program product provided according to a seventh aspect of the embodiments of the present disclosure includes a computer readable code, where when the computer readable code runs in a device, a processor in the device executes instructions for implementing the method for child state analysis according to any one of the foregoing embodiments.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like for performing specific tasks or implementing specific abstract data types. The computer system/server may be implemented in the distributed cloud computing environments in which tasks are performed by remote processing devices that are linked through a communications network. In the distributed computing environments, the program modules may be located in local or remote computing system storage media including storage devices.

Figure 1:
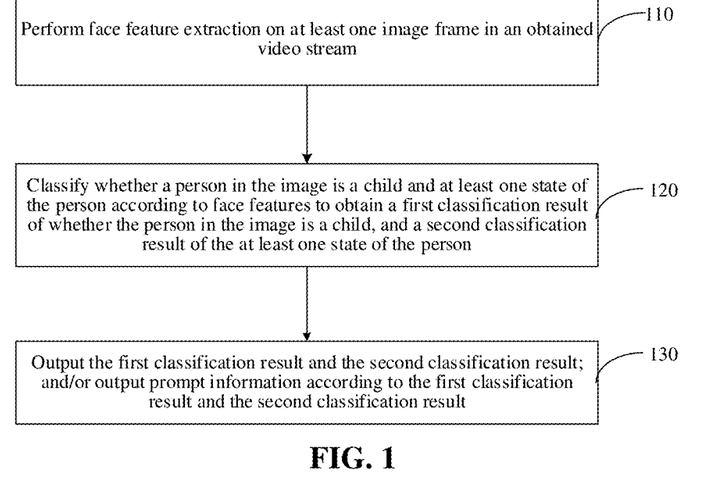
FIG. 1 is a schematic flowchart of a method for child state analysis provided by the embodiments of the present disclosure.

FIG. 1 is a schematic flowchart of a method for child state analysis provided by the embodiments of the present disclosure. The method may be executed by any child state analysis device, such as, a terminal device, a server, a mobile device, and a vehicle-mounted device, which is not limited in the embodiments of the present disclosure. As shown in FIG. 1, the method of the embodiments includes the following steps.

At step 110, feature extraction is performed on at least one image frame in an obtained video stream.

In some embodiments, in general, the state of a person cannot be determined according to the state of a single image frame. For example, if it is required to determine whether the person is in a sleep state, not only eyes of the person in the single image frame need to be in a closed state, but also the closed state of the eyes in multiple image frames is required to be determined. Therefore, in the embodiments of the present disclosure, state analysis is performed according to the obtained video stream.

In the embodiments, feature extraction may be performed on an image in a video stream by using any neural network capable of implementing feature extraction, or other approaches, to obtain face features. The specific approach of obtaining the face features is not limited in the embodiments of the present disclosure. The embodiments can be applied in a video stream acquired by a camera device in any space. Since an image in the obtained video stream generally not only includes a face, optionally, before performing feature extraction, the method further includes performing face recognition on the image in the obtained video stream to obtain a face image.

In one optional example, step 110 may be executed by a processor by invoking a corresponding instruction stored in a memory, or may be executed by a feature extraction unit 71 run by the processor.

At step 120, whether a person in the at least one image frame is a child and at least one state of the person are classified according to face features to obtain a first classification result of whether the person in the at least one image frame is a child, and a second classification result of the at least one state of the person.

The child referred to in the embodiments of the present disclosure includes, but is not limited to: a child, an infant, a toddler, etc. Moreover, determining whether the person in an image is a child includes determining a person who is considered to be a child by the public as a child, or determining a person under a reference age or a customized age as a child. For example, the reference age may be a child age stipulated by the law (e.g., 12 years old), or the customized age may be set as three years old, six years old, eight years old, etc. The specific age of the child is not limited in the embodiments of the present disclosure. Different age groups may be customized as children according to specific conditions. For example, those under six years old are defined as children in a kindergarten, but those under 12 years old are defined as children while riding.

In addition to determining whether a person in an image is a child based on the age, it is also possible to directly classify whether the person in an input image is a child through classification branches such as a trained neural network, instead of through the age.

In the embodiments of the present disclosure, whether the person in the at least one image frame is a child is determined based on the obtained face features (two classification results are included: one indicates that the person is a child, and the other indicates that the person is not a child), and the state of the person in the image is determined based on the obtained face features (classification results of multiple states are included, such as a normal state, an abnormal state, a sleep state, a wake-up state, and a state of leaving the child seat).

In the embodiments, the face features obtained in step 110 are respectively processed by at least two neural networks, whether the person is a child is determined by one neural network, and the at least one state is classified by the other at least one neural network. Alternatively, feature extraction is implemented and whether the person is a child and classification of at least one state are determined by one neural network. In this case, the neural network includes a feature extraction branch and at least two classification branches connected to the feature extraction branch, or further includes a statistical classification branch connected to the at least two classification branches. The at least two classification branches respectively determine whether the person in the image is a child and the classification of the at least one state of the person according to the face features, and the statistical classification branch collects statistics about classification results of at least one face state of the person corresponding to the at least one image frame in the video stream, and determines the classification of the at least one state of the person based on the statistical result. In the embodiments, at least two classification results are obtained by sharing the face features, thereby reducing the repeated feature extraction processes and improving the image processing speed.

In one optional example, step 120 may be executed by a processor by invoking a corresponding instruction stored in a memory, or may be executed by a classification unit 72 run by the processor.

At step 130, the first classification result and the second classification result are output; and/or the prompt information is output according to the first classification result and the second classification result.

In the embodiments, after the first classification result and the second classification result are obtained, in one case, the first classification result and the second classification result are output. In this case, a user may view and identify the first classification result and the second classification result, and performs corresponding processing according to the first classification result and the second classification result. In the other case, when it is possible to output the prompt information according to the first classification result and the second classification result, the prompt information is directly output in the embodiments. In this case, the user may view and process the first classification result and the second classification result, and receives the prompt information in particular situations (for example, when the child is in a crying state, or the like). In the embodiments, sending the prompt information directly improves the user's processing efficiency for particular situations and reduces the problem of delaying the processing time because of the need to identify the classification results due to the excessive information.

The prompt information includes, but is not limited to, at least one type of the following information: sound prompt information, image prompt information, vibration prompt information, smell prompt information, etc. The specific expression form of the prompt information is not limited in the embodiments as long as other people can receive the information.

In one optional example, step 130 may be executed by a processor by invoking a corresponding instruction stored in a memory, or may be executed by a result output unit 73 run by the processor.

Based on the method for child state analysis provided in the foregoing embodiments of the present disclosure, face feature extraction is performed on at least one image frame in an obtained video stream; whether a person in the image is a child and at least one state of the person are classified by sharing extracted face features to obtain a first classification result of whether the person in the image is a child, and a second classification result of the at least one state of the person; and the first classification result and the second classification result are output. By sharing the face features, The size of a network is reduced, the network complexity is reduced, the network processing speed is accelerated, and quick child state analysis is implemented, so as to handle different states of a child in time.

Figure 2:
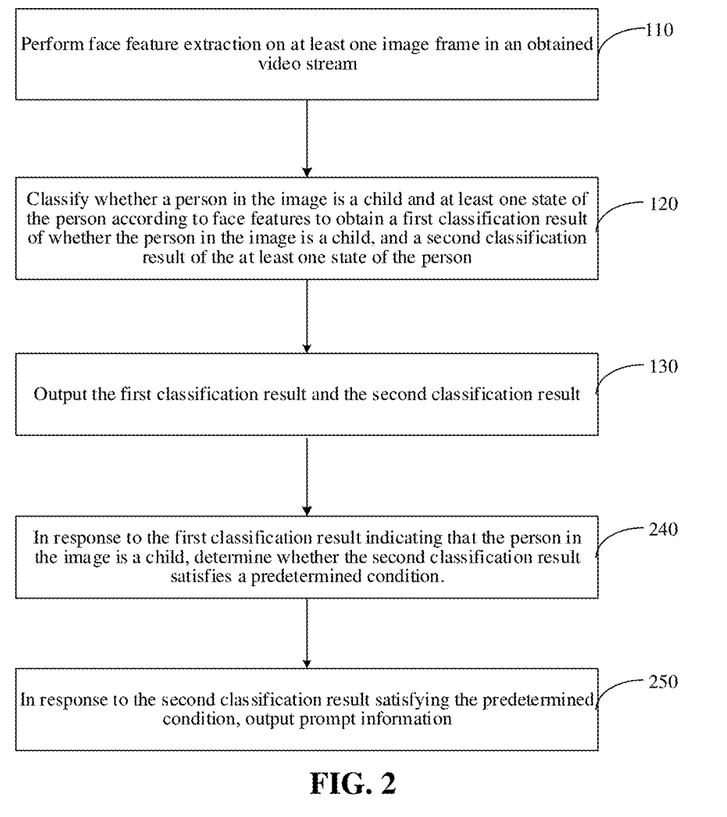
FIG. 2 is another schematic flowchart of a method for child state analysis provided by the embodiments of the present disclosure.

FIG. 2 is another schematic flowchart of a method for child state analysis provided by the embodiments of the present disclosure. As shown in FIG. 2, after step 130, the method according to the embodiments further includes the following steps.

At step 240, in response to the first classification result indicating that the person in the at least one image frame is a child, whether the second classification result satisfies a predetermined condition is determined.

It is possible to determine the state of the person who is a child and the state of the person who is not a child by combining the classification result of whether the person is a child and the classification result of the state which are obtained in the same image. Since the state of a child is more difficulty to control, more attention is required. In the embodiments, the state of the child is obtained from the results.

At step 250, in response to the second classification result satisfying the predetermined condition, prompt information is output.

Compared with other groups such as adults, children are more likely to produce negative states due to external stimuli. When satisfying a preset condition (e.g., crying), the state of a child needs to be handled by other people in time to reduce the probability of danger. In the embodiments of the present disclosure, in order to enable other people to discover the state of the child in time, prompt information is sent to draw other people's attention. The prompt information includes, but is not limited to, at least one type of the following information: sound prompt information, image prompt information, vibration prompt information, smell prompt information, etc. The specific expression form of the prompt information is not limited in the embodiments as long as other people can receive the information.

In one or more optional embodiments, the state of the person includes, but is not limited to, at least one of the following: a normal state, an abnormal state, a sleep state, a wake-up state, a state of leaving the child seat, etc.

The second classification result includes, but is not limited to, at least one of the following: whether the state of the person is the normal state, whether the state of the person is the abnormal state, whether the state of the person is the sleep state, whether the state of the person is the wake-up state, whether the state of the person is the state of leaving the child seat, etc.

In some embodiments, it can be considered that the person is in the normal state if the face is in a calm state (no obvious changes in the facial features), while in other states, the abnormal state can be defined according to characteristics of a group to be analyzed (such as the characteristics of children). For example, for a child, it can be considered that the abnormal state includes, but is not limited to, at least one of the following: a crying state, irritable state, a vomiting state, a choking state, a pain state, etc. When a child is in any one of the abnormal states, there may be certain danger or urgency; therefore, others need to pay attention thereto and take corresponding actions. The sleep state may refer to that the eyes of the person are closed for a preset duration, while the wake-up state refers to a transition from the sleep state to the wake-up state. In general, the wake-up state of a child is accompanied by the abnormal states such as crying; therefore, attention also needs to be paid to the wake-up state of the child. Moreover, when a child is in a vehicle, for the sake of safety, the child needs to sit on a child seat to reduce the probability of danger caused by vehicle movements such as accidental parking. Therefore, in addition to the analysis on the above-mentioned states of a child in a vehicle, it is also necessary to analyze whether the child is in the state of leaving the child seat. If the child is in the state of leaving the child seat, it indicates that the child may be in danger anytime, and other people such as an adult need to adjust the position of the child.

In some embodiments, the predetermined condition includes, but is not limited to, at least one of the following: the state of the person is the abnormal state, the state of the person is the wake-up state, the state of the person is the state of leaving the child seat, etc.

In the embodiments of the present disclosure, when the second classification result satisfies at least one of the predetermined conditions provided above, the prompt information needs to be sent to ensure that other people can adjust the state of the child in time to ensure the safety thereof. For example, if a child is crying (an abnormal state) in a baby room, the prompt information needs to be sent to prompt a guardian to handle in time so as to reduce the probability of danger. Alternatively, in a kindergarten, if a child who is vomiting and/or choking on food is not handed in time, the child's life may be in danger. Therefore, it is necessary to send the prompt information (such as, sound prompt information) to draw other adults' attention to handle the state of the child or send to the hospital in time.

In some embodiments, the abnormal state may be divided into an emergency situation and a non-emergency situation. The emergency situation generally refers to the need for timely handling, and if it is not handled in time, serious consequences may occur. For example, if a child who is vomiting and/or choking on food is not handed in time, the child's life may be in danger. However, the non-emergency situation is merely relative to the emergency situation. Abnormal situations usually need to be handled in time. Optionally, in response to the person being in the crying state for a first preset duration, and/or the person being the irritable state for a second preset duration, and/or the person being in the pain state for a third preset duration, prompt information is output.

The state of a child is usually an unstable state. A child may be crying and/or irritable in the last second, and automatically recover in the next second. Therefore, if the duration of the crying state is less than the first preset duration, it may be unnecessary to send the prompt information, so as to reduce the frequency of sending the prompt information and improve the user experience. Irritability is different from crying. Crying is the own behavior of a child, and has smaller impact on other children (when in a child group), while irritability may threaten other children (irritability may cause a physical conflict in a child group). Therefore, the first preset duration corresponding to the crying state and the second preset duration corresponding to the irritable state are usually different. Moreover, when a child is the crying state and/or the irritable state and/or the pain state for their respective preset duration, it means that the state of the child cannot be recovered automatically, and requires external intervention. In the embodiments of the present disclosure, external intervention is achieved by sending the prompt information.

Figure 3:
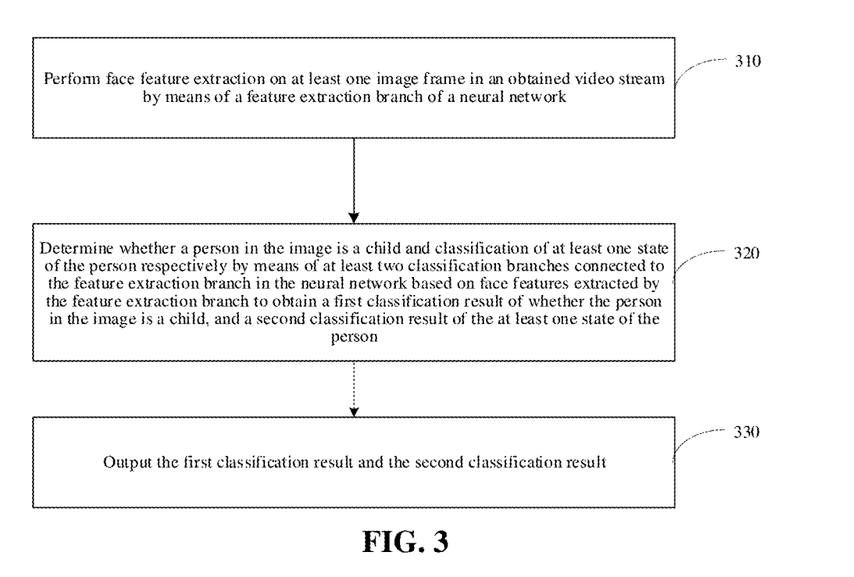
FIG. 3 is yet another schematic flowchart of a method for child state analysis provided by the embodiments of the present disclosure.

FIG. 3 is yet another schematic flowchart of a method for child state analysis provided by the embodiments of the present disclosure. As shown in FIG. 3, the method of the embodiments includes the following steps.

At step 310, face feature extraction is performed on the at least one image frame in the obtained video stream by using a feature extraction branch of a neural network.

At step 320, whether the person in the at least one image frame is a child and classification of the at least one state of the person are determined respectively by using at least two classification branches connected to the feature extraction branch in the neural network based on the face features extracted by the feature extraction branch, to obtain a first classification result of whether the person in the at least one image frame is a child, and a second classification result of the at least one state of the person.

At step 330, the first classification result and the second classification result are output.

The embodiments of the present disclosure are implemented by a neural network including a feature extraction branch and at least two classification branches. At least two classification results (e.g., the classification result of whether the person is a child, the classification result of the at least one state of the person, etc.) are simultaneously obtained by the at least two classification branches. Feature extraction is performed on a face image by the feature extraction branch of the neural network. Since there is no need for multiple classification branches to perform feature extraction respectively, the network processing speed is accelerated. The participation of the feature extraction branch makes the network more robust and have higher generalization capability. Since parameters are shared, the face feature extraction operation only needs to be performed once, and then, on this basis, whether the person is a child and the state of the person are determined, and the classification is performed with the same face feature, thereby improving the classification accuracy and improving the feed-forward speed of the network.

Figure 4:
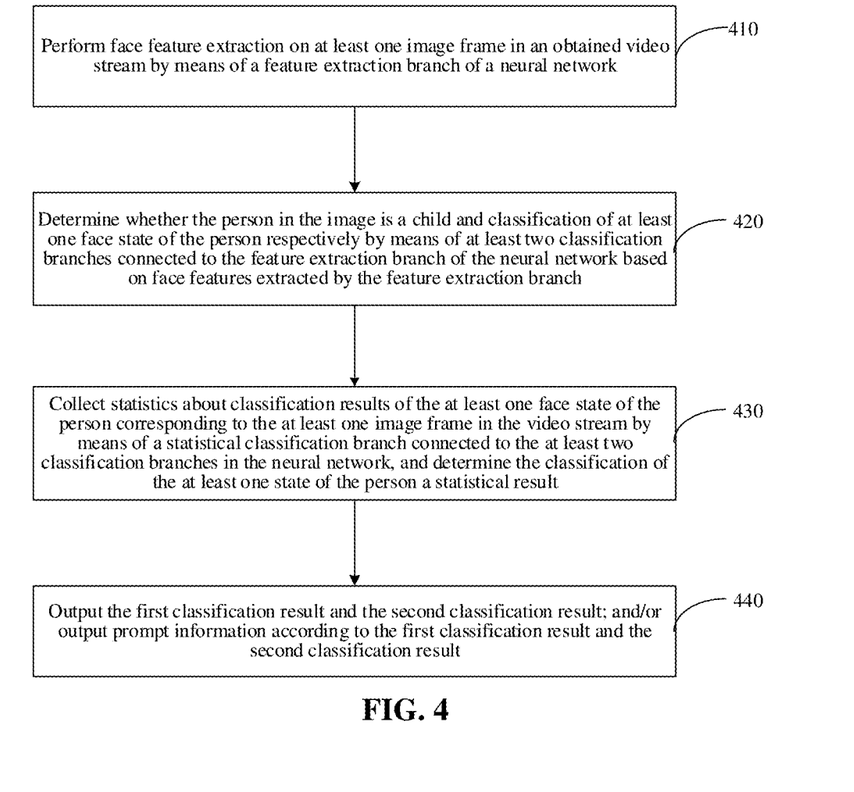
FIG. 4 is still another schematic flowchart of a method for child state analysis provided by the embodiments of the present disclosure.

FIG. 4 is still another schematic flowchart of a method for child state analysis provided by the embodiments of the present disclosure. As shown in FIG. 4, the method of the embodiments includes the following steps.

At step 410, face feature extraction is performed on the at least one image frame in the obtained video stream by using a feature extraction branch of a neural network.

At step 420, whether the person in the at least one image frame is a child and classification of at least one face state of the person are determined respectively by using at least two classification branches connected to the feature extraction branch in the neural network based on the face features extracted by the feature extraction branch.

In some embodiments, the face state of the person includes, but is not limited to, at least one of the following: an eye open state, an eye closed state, etc.

At step 430, statistics collection are performed on classification results of the at least one face state of the person corresponding to the at least one image frame in the video stream by using a statistical classification branch connected to the at least two classification branches in the neural network, and the classification of the at least one state of the person is determined based on counting statistical result.

The state of the person determined through different face states can be determined by combining the statistical results of the face state within a preset duration. For example, when the statistical classification branch determines that the face state is in the eye closed state for a set time (the classification result of multiple continuously received image frames is the eye closed state) or the time proportion in the eye closed state within a preset duration window exceeds a threshold, it can be considered that the person is in the sleep state. However, when the statistical classification branch determines that the face state changes from closing eyes for a long time to opening eyes for a certain time (at least one face state after the eyes are closed is the eye open state), it can be considered that the person is in a wake-up state. Whether a child has left a child seat is determined by detecting the face or the body in a child seat area and by combining the statistical results of the face or the body within a set time. For example, if no child is detected on an image corresponding to the child seat within a certain time period after a child is detected on the child seat, it can be determined that the child has left the child seat.

At step 440, the first classification result and the second classification result are output; and/or prompt information is output according to the first classification result and the second classification result.

Some states that cannot be determined through a single image frame need to be determined by combining the face states of multiple continuous image frames (the multiple continuous frames may be temporally continuous frames in a video or may be multiple frames with intervals in the video), e.g., the normal state, the abnormal state, the sleep state, the wake-up state, the state of leaving the child seat, etc. Therefore, in the embodiments of the present disclosure, statistics are collected about the face states of the multiple image frames in combination with the statistical classification branch so as to determine the second classification result of the person.

Annotation of a sample image, for example, the annotation of information, such as whether the person is a child, whether the child is crying, whether the eyes are opened, and whether the eyes are closed, can be implemented through manual annotation, machine annotation, or other approaches, which is not limited in the embodiments of the present disclosure.

In some embodiments, a classification branch for determining whether the person in the at least one image frame is a child is pre-trained based on annotation data for children of distinguishing genders, so as to improve the accuracy of child classification.

In the embodiments of the present disclosure, the determination of whether the person in the at least one image frame is a child is implemented by the classification branch. The classification branch is trained via a sample image. Since different genders will behave differently on face features, i.e., different results may be obtained for boys and girls of the same age during age identification. Therefore, in order to improve the classification accuracy of the classification branch, the sample image may be distinguished based on the gender of the child when training the classification branch.

In one or more optional embodiments, before step 110, the method of the embodiments further includes:

training the neural network by using a sample image which is provided with child annotation information and state annotation information.

In the embodiments of the present disclosure, before analyzing the state of a child, like other neural networks, the neural network needs to be trained. Since the neural network includes at least two classification branches, a sample image for training the neural network should have child annotation information and at least one type of state annotation information. At least two losses are obtained by using different classification branches, and a neural network for simultaneously classifying the child and the state is obtained by training the neural network based on all the losses.

In some embodiments, the child annotation information indicates whether the person in the sample image is a child. In response to the age or estimated age of the person in the sample image being greater than the age or estimated age of the person in a reference image, the child annotation information of the sample image indicates that the person is not a child. When the age or estimated age of the person in the sample image is less than or equal to the age or estimated age of the person in the reference image, the child annotation information of the sample image indicates that the person is a child.

An error may occur in whether determining the estimated age manually or determining the age of the person the network. Therefore, the age of the person in the sample image may be the provided age calculated according to the date of birth or the estimated age determined manually or by the network. The age or estimated age can also be used for the person in the reference image.

Since different people have different judgment standards for children, different annotation results may be obtained after the same image is annotated by different people. In the embodiments, comparing the sample image with the reference image to determine whether the person in the sample image is a child reduces the difference of judgment standards caused by manual annotation, and improves the accuracy of the child annotation information of the sample image, thereby improving the accuracy of training a network. Optionally, the determination of whether the age or estimated age of the person in the sample image is greater than the age or estimated age of the person in the reference image may be implemented manually or by a trained neural network.

In some embodiments, the reference image includes a boy reference image and a girl reference image.

Figure 5:
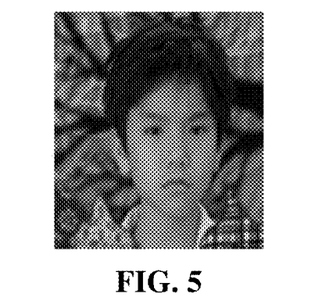
FIG. 5 is a boy reference image in an example of a method for child state analysis provided by the embodiments of the present disclosure.
Figure 6:
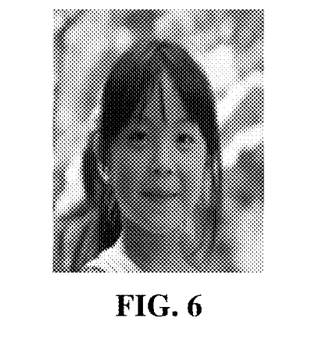
FIG. 6 is a girl reference image in an example of a method for child state analysis provided by the embodiments of the present disclosure.

Different genders also have different judgment standards for children, and there is usually a large difference in people's visual perception. Therefore, in order to reduce errors in annotation information caused by the gender difference, in the embodiments, a boy reference image and a girl reference image are respectively set for male and female, thereby improving the reliability of the annotation information. For example, FIG. 5 is a boy reference image in an example of a method for child state analysis provided by the embodiments of the present disclosure. FIG. 6 is a girl reference image in an example of a method for child state analysis provided by the embodiments of the present disclosure. A boy reference image and a girl reference image which are different are used as standards respectively. If the age of the person is greater than the age or estimated age of the persons in the reference images, it is determined that the person is not a child. If the age of the person is less than the age or estimated age of the persons in the reference images, it is determined that the person is a child. Determining whether the person in an image is a child by classifying into male and female reduces the noise of a child data set and improves the precision thereof.

In some embodiments, training the neural network by using the sample image includes:

performing face feature extraction on the sample image by using the feature extraction branch;

classifying whether the person in the sample image is a child and at least one state of the person by sharing face features extracted by the at least two classification branches, to obtain a first predicted classification result of whether the person in the sample image is a child, and a second predicted classification result of the at least one state of the person;

obtaining a first loss based on the first predicted classification result and the child annotation information, and obtaining a second loss based on the second predicted classification result and the state annotation information; and adjusting parameters of the neural network based on the first loss and the second loss.

In some embodiments, there may be at least one second predicted classification result, which correspondingly includes at least one type of state annotation information, i.e., at least one second loss is obtained. In this case, the parameters of the neural network are adjusted based on the first loss and the at least one second loss.

In some embodiments, child data (including a child picture and a non-child picture) and child state data (for example, including the crying state, a non-crying state, etc.) are taken as inputs of a network, and these pictures are flipped horizontally, cropped randomly, and subjected to color disturbance to serve as data enhancement. The face features are extracted from these data by a face feature extraction network. It is designed that the classification branch for determining a child and the classification branch for determining the state of the child are located behind the extracted feature extraction branch. A classification loss of the child and a classification loss of the state of the child are calculated respectively, and are added together as the final loss. A stochastic gradient descent algorithm is used for training the network. For example, a deep convolutional neural network is used as the feature extraction branch. In each layer, convolution kernels of different scales (such as 3×3 and 5×5) and maximum pooling are used to extract information of different scales, and these information is spliced as an input of the next layer. Optionally, in order to improve the model training speed, a 1×1 convolution can be used for dimension reduction, and a large convolution kernel is decomposed into multiple small convolution kernels (for example, a 5×5 convolution kernel is decomposed into two 3×3 convolution kernels) to implement a network having the same function. A network having a small convolution kernel is selected to implement the embodiments. Finally, a residual module is introduced to optimize the propagation of the gradient in the network. the two are combined to better extract face feature information.

In some embodiments, adjusting the parameters of the neural network based on the first loss and the second loss includes:

performing weighted summation on the first loss and the second loss to obtain a network loss; and adjusting parameters of the feature extraction branch and the least two classification branches based on the network loss.

Weighted summation is performed on the first loss and the second loss, where there may be one or more second losses. When there are multiple second losses, weighted summation is performed on the first loss and the multiple second losses, and the neural network is trained according to the network loss obtained by weighted summation, thereby improving the network training speed and improving the network performance of the neural network obtained through training.

In one or more optional embodiments, the method of the embodiments of the present disclosure further includes:

displaying at least one piece of the following information by using a vehicle-mounted device and/or terminal device: the obtained video stream, the first classification result, at least one second classification result, or the prompt information.

In the vehicle driving process, more attention needs to be paid to the state of a child. In order to make a driver or other members in a vehicle know the state of the child in the vehicle, optionally, the above-mentioned at least one piece of information is received and displayed by the vehicle-mounted device, where displaying is not limited to displaying on a screen, and but also allows the user to receive the prompt information by other modes such as the playback of sound prompt information and conducted vibration prompt information. Displaying the information through the vehicle-mounted device enables the driver or other members in the vehicle to view the situation in the vehicle in time while the terminal device implements the monitoring of a child in other spaces (e.g., in a vehicle, a classroom, etc.) at any position for example, monitoring the situation in the vehicle at other positions outside the vehicle. When leaving the vehicle temporarily, the driver can view the state of passengers in the vehicle, especially the child, by using the terminal device (such as a mobile phone). Upon receipt of the prompt information, the driver can return to the vehicle in time to handling the emergency situation. For example, in the highway rest area, the driver wants to go to the toilet, but he/she is worried about the situation of the child in the vehicle, then he/she can enable the smart rear monitoring function through a mobile phone App.

In one or more optional embodiments, before performing face feature extraction on at least one image frame in the obtained video stream, the method further includes:

acquiring a video stream by using at least one camera provided in a vehicle.

In order to determine the state in a face image, using an individual face image as an analysis basis will lead to inaccuracies such as an unclear image or an expression change. In the embodiments, in order to implement accurate state monitoring, images of passengers in a vehicle are acquired by using a camera in the vehicle to obtain a video stream, the face image is obtained from at least one image frame in the video stream, and the state of a child in the vehicle is monitored according to the obtained face image.

A person of ordinary skill in the art may understand that: all or some steps of implementing the forgoing embodiments of the method may be achieved by a program by instructing related hardware; the foregoing program may be stored in a computer-readable storage medium; when the program is executed, the steps in the foregoing embodiments of the method are performed; moreover, the foregoing storage medium includes various media capable of storing program codes such as an ROM, an RAM, a magnetic disk, or an optical disk.

Figure 7:
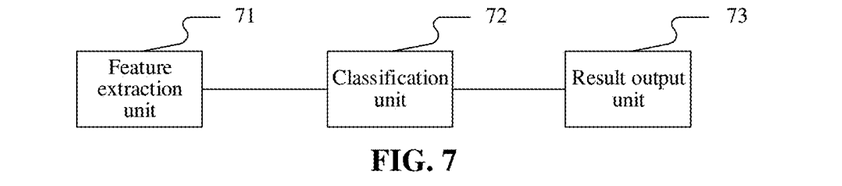
FIG. 7 is a schematic structural diagram of an apparatus for child state analysis provided by the embodiments of the present disclosure.

FIG. 7 is a schematic structural diagram of an apparatus for child state analysis provided by the embodiments of the present disclosure. The apparatus of the embodiments is configured to implement the foregoing child state analysis method embodiments of the present disclosure. As shown in FIG. 7, the apparatus of the embodiments includes:

a feature extraction unit 71, configured to perform face feature extraction on at least one image frame in an obtained video stream;

a classification unit 72, configured to classify whether a person in an image is a child and at least one state of the person according to face features to obtain a first classification result of whether the person in the at least one image frame is a child, and a second classification result of the at least one state of the person; and a result output unit 73, configured to output the first classification result and the second classification result; and/or output prompt information according to the first classification result and the second classification result.

Based on the apparatus for child state analysis provided in the foregoing embodiments of the present disclosure, face feature extraction is performed on at least one image frame in an obtained video stream; whether a person in the image is a child and at least one state of the person are classified according to face features to obtain a first classification result of whether the person in the image is a child, and a second classification result of the at least one state of the person; the first classification result and the second classification result are output; and/or prompt information is output according to the first classification result and the second classification result. By sharing the face features, the size of a network is reduced, the network complexity is reduced, the network processing speed is accelerated, and quick child state analysis is implemented, so as to handle different states of a child in time.

In one or more optional embodiments, the apparatus of the embodiments of the present disclosure further includes:

a child determination unit, configured to: in response to a first classification result indicating that the person in an image is a child, determine whether a second classification result satisfies a predetermined condition; and a prompt unit, configured to: in response to the second classification result satisfying the predetermined condition, output prompt information.

Compared with other groups such as adults, children are more likely to produce negative states due to external stimuli. When satisfying a preset condition (e.g., crying), the state of a child needs to be handled by other people in time to reduce the probability of danger. In the embodiments of the present disclosure, in order to enable other people to discover the state of the child in time, prompt information is sent to draw other people's attention. The prompt information includes, but is not limited to, at least one type of the following information: sound prompt information, image prompt information, vibration prompt information, smell prompt information, etc. The specific expression form of the prompt information is not limited in the embodiments as long as other people can receive the information.

In one or more optional embodiments, the state of the person includes, but is not limited to, at least one of the following: a normal state, an abnormal state, a sleep state, a wake-up state, a state of leaving the child seat, etc.

The second classification result includes, but is not limited to, at least one of the following: whether the state of the person is the normal state, whether the state of the person is the abnormal state, whether the state of the person is the sleep state, whether the state of the person is the wake-up state, whether the state of the person is the state of leaving the child seat, etc.

In some embodiments, the abnormal state includes, but is not limited to, at least one of the following: a crying state, irritable state, a vomiting state, a choking state, a pain state, etc.

In some embodiments, the predetermined condition includes, but is not limited to, at least one of the following: the state of the person is the abnormal state, the state of the person is the wake-up state, the state of the person is the state of leaving the child seat, etc.

In some embodiments, the prompt unit is configured to: in response to the person being in the crying state for a first preset duration, and/or the person being in the irritable state for a second preset duration, and/or the person being in the pain state for a third preset duration, output prompt information.

In one or more optional embodiments, the feature extraction unit 71 is configured to perform face feature extraction on the at least one image frame in the obtained video stream by using a feature extraction branch of a neural network; and the classification unit 72 is configured to determine whether the person in the at least one image frame is a child and classification of the at least one state of the person respectively by using at least two classification branches connected to the feature extraction branch in the neural network based on the face feature extracted by the feature extraction branch.

The embodiments of the present disclosure are implemented by a neural network including a feature extraction branch and at least two classification branches. At least two classification results (e.g., the classification result of whether the person is a child, the classification result of the at least one state of the person, etc.) are simultaneously obtained by the at least two classification branches. Feature extraction is performed on a face image by the feature extraction branch of the neural network. Since there is no need for multiple classification branches to perform feature extraction respectively, the network processing speed is accelerated. The participation of the feature extraction branch makes the network more robust and have higher generalization capability. Since parameters are shared, the face feature extraction operation only needs to be performed once, and then, on this basis, whether the person is a child and the state of the person are determined, and the classification is performed with the same face feature, thereby improving the classification accuracy and improving the feed-forward speed of the network.

In one or more optional embodiments, the feature extraction unit 71 is configured to perform face feature extraction on the at least one image frame in the obtained video stream by using a feature extraction branch of a neural network; and the classification unit 72 is configured to determine whether the person in the at least one image frame is a child and classification of at least one face state of the person respectively by using at least two classification branches connected to the feature extraction branch in the neural network based on the face feature extracted by the feature extraction branch; and collect statistics about classification results of the at least one face state of the person corresponding to the at least one image frame in the video stream by using a statistical classification branch connected to the at least two classification branches in the neural network, and determine the classification of at least one state of the person based on a statistical result.

Some states that cannot be determined through a single image frame need to be determined by combining the face states of multiple continuous image frames (the multiple continuous frames may be temporally continuous frames in a video or may be multiple frames with intervals in the video), e.g., the normal state, the abnormal state, the sleep state, the wake-up state, the state of leaving the child seat, etc. Therefore, in the embodiments of the present disclosure, statistics are collected about the face states of the multiple image frames in combination with the statistical classification branch so as to determine the second classification result of the person.

In some embodiments, the face state of the person includes, but is not limited to, at least one of the following: an eye open state, an eye closed state, etc.

In some embodiments, a classification branch for determining whether the person in the at least one image frame is a child is pre-trained based on annotation data for children of distinguishing genders.

In one or more optional embodiments, the apparatus of the embodiments of the present disclosure further includes:

a network training unit, configured to train a neural network by using a sample image which is provided with child annotation information and state annotation information.

In the embodiments of the present disclosure, before analyzing the state of a child, like other neural networks, the neural network needs to be trained. Since the neural network includes at least two classification branches, a sample image for training the neural network should have child annotation information and at least one type of state annotation information. At least two losses are obtained by using different classification branches, and a neural network for simultaneously classifying the child and the state is obtained by training the neural network based on all the losses.

In some embodiments, the child annotation information indicates whether the person in the sample image is a child. In response to the age or estimated age of the person in the sample image being greater than the age or estimated age of the person in a reference image, the child annotation information of the sample image indicates that the person is not a child. In response to the age or estimated age of the person in the sample image being less than or equal to the age or estimated age of the person in the reference image, the child annotation information of the sample image indicates that the person is a child.

In some embodiments, the reference image includes a boy reference image and a girl reference image.

In some embodiments, the network training unit is configured to: perform face feature extraction on a sample image by using the feature extraction branch; classify whether the person in the sample image is a child and at least one state of the person by sharing extracted face features by the at least two classification branches, to obtain a first predicted classification result of whether the person in the sample image is a child, and a second predicted classification result of the at least one state of the person; obtain a first loss based on the first predicted classification result and the child annotation information, and obtain a second loss based on the second predicted classification result and the state annotation information; and adjust parameters of the neural network based on the first loss and the second loss.

In some embodiments, the network training unit configured to adjust the parameters of the neural network based on the first loss and the second loss, is configured to: perform weighted summation on the first loss and the second loss to obtain a network loss; and adjust parameters of the feature extraction branch and the at least two classification branches based on the network loss.

In one or more optional embodiments, the apparatus of the embodiments of the present disclosure further includes:

a vehicle-mounted device and/or terminal device, configured to display at least one piece of the following information: the obtained video stream, the first classification result, the at least one second classification result, or the prompt information.

In one or more optional embodiments, the apparatus of the embodiments of the present disclosure further includes:

at least one camera provided in a vehicle and configured to obtain the video stream.

In order to determine the state in a face image, using an individual face image as an analysis basis will lead to inaccuracies such as an unclear image or an expression change. In the embodiments, in order to implement accurate state monitoring, images of passengers in a vehicle are acquired by a camera in the vehicle to obtain a video stream, the face image is obtained from at least one image frame in the video stream, and the state of a child in the vehicle is monitored according to the obtained face image.

For the working process, the setting mode, and the corresponding technical effect of any embodiment of the apparatus for child state analysis provided by the embodiments of the present disclosure, reference may be made to the specific descriptions of the corresponding method embodiment of the present disclosure, and details are not described herein again due to space limitation.

A vehicle provided according to another aspect of the embodiments of the present disclosure includes: the apparatus for child state analysis according to any one of the foregoing embodiments.

An electronic device provided according to yet another aspect of the embodiments of the present disclosure includes a processor, where the processor includes the apparatus for child state analysis according to any one of the foregoing embodiments.

An electronic device provided according to yet another aspect of the embodiments of the present disclosure includes: a memory, configured to store executable instructions; and a processor, configured to communicate with the memory to execute the executable instructions so as to implement the method for child state analysis according to any one of the foregoing embodiments.

A computer storage medium provided according to still another aspect of the embodiments of the present disclosure is configured to store computer readable instructions, where when the instructions are executed, operations of the method for child state analysis according to any one of the foregoing embodiments are executed.

Figure 8:
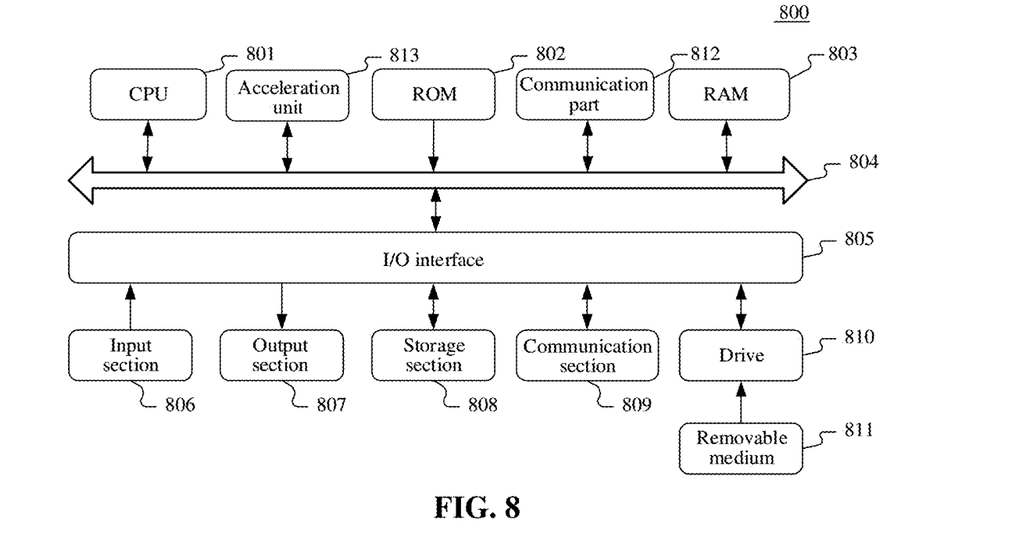
FIG. 8 is a schematic structural diagram of an electronic device suitable for implementing a terminal device or a server according to the embodiments of the present disclosure.

The embodiments of the present disclosure further provide an electronic device which, for example, may be a mobile terminal, a PC, a tablet computer, a server, and the like. Referring to FIG. 8 below, a schematic structural diagram of an electronic device 800, which may be a terminal device or a server, suitable for implementing the embodiments of the present disclosure is shown. As shown in FIG. 8, the electronic device 800 includes one or more processors, a communication part, and the like. The one or more processors are, for example, one or more Central Processing Units (CPUs) 801, and/or one or more special purpose processors. The special purpose processors may be used as acceleration units 813, and may include but are not limited to Graphics Processing Unit (GPU), FPGA, DSP, and other types of special purpose processors such as an ASIC chip or the like. The processors may execute appropriate actions and processing according to executable instructions stored in a Read-Only Memory (ROM) 802 or executable instructions loaded from a storage section 808 to a Random Access Memory (RAM) 803. The communication part 812 may include, but is not limited to, a network card. The network card may include, but is not limited to, an Infiniband (IB) network card.

The processor may communicate with the ROM 802 and/or the RAM 803 to execute the executable instructions, be connected to the communication part 812 via a bus 804, and communicate with other target devices via the communication part 812, thereby completing corresponding operations of the method provided by any one of the embodiments of the present disclosure, such as performing face feature extraction on at least one image frame in an obtained video stream; classifying whether a person in the image is a child and at least one state of the person by sharing extracted face feature to obtain a first classification result of whether the person in the image is a child, and a second classification result of the at least one state of the person; and outputting the first classification result and the second classification result.

In addition, the RAM 803 may further store various programs and data required for operations of the apparatus. The CPU 801, the ROM 802, and the RAM 803 are connected to each other via the bus 804. In the presence of the RAM 803, the ROM 802 is an optional module. The RAM 803 stores executable instructions, or writes the executable instructions into the ROM 802 during running, where the executable instructions cause the CPU 801 to execute corresponding operations of the foregoing communication method. An Input/Output (I/O) interface 805 is also connected to the bus 804. The communication part 812 is integrated, or is configured to have multiple sub-modules (for example, multiple IB network cards) connected to the bus.

The following components are connected to the I/O interface 805: an input section 806 including a keyboard, a mouse and the like; an output section 807 including a Cathode-Ray Tube (CRT), a Liquid Crystal Display (LCD), a speaker and the like; the storage section 808 including a hard disk drive and the like; and a communication section 809 of a network interface card including an LAN card, a modem and the like. The communication section 809 performs communication processing via a network such as the Internet. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium is installed on the storage section 808 according to requirements.

It should be noted that, the architecture shown in FIG. 8 is merely an optional implementation. During specific practice, the number and types of the components in FIG. 8 may be selected, decreased, increased, or replaced according to actual requirements. Different functional components may be separated or integrated or the like. For example, the acceleration unit 813 and the CPU 801 may be separated, or the acceleration unit 813 may be integrated on the CPU 801, and the communication part may be separated from or integrated on the CPU 801 or the acceleration unit 813 or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product, which includes a computer program tangibly included in a machine-readable medium. The computer program includes a program code for executing a method shown in the flowchart. The program code may include corresponding instructions for correspondingly executing steps of the methods provided by the embodiments of the present disclosure, such as performing face feature extraction on at least one image frame in an obtained video stream; classifying whether a person in the at least one image frame is a child and at least one state of the person by sharing extracted face features to obtain a first classification result of whether the person in the at least one image frame is a child, and a second classification result of the at least one state of the person; and outputting the first classification result and the second classification result. In such embodiments, the computer program is downloaded and installed from the network through the communication section 809, and/or is installed from the removable medium 811. The computer program, when being executed by the CPU 801, executes the operations of the foregoing functions defined in the methods of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make persons of ordinary skill in the art understand the present disclosure, so as to design various embodiments with various modifications applicable to particular use.

The invention claimed is:

1. A method for child state analysis, comprising:
performing face feature extraction on at least one image frame in an obtained video stream by using a feature extraction branch of a neural network;
respectively determining whether a person in the at least one image frame is a child and classification of at least one state of the person based on face features extracted by the feature extraction branch by using at least two classification branches connected to the feature extraction branch in the neural network; and
outputting a first classification result and a second classification result, wherein
a classification branch of the at least two classification branches for determining whether the person in the at least one image frame is a child is pre-trained based on annotation data for children of distinguishing genders, and the pre-training comprises:
performing face feature extraction on a sample image by using the feature extraction branch;
classifying whether a person in the sample image is a child and at least one state of the person in the sample image by sharing the extracted face features by the at least two classification branches, to obtain a first predicted classification result of whether the person in the sample image is a child and a second predicted classification result of the at least one state of the person in the sample image;
obtaining a first loss based on the first predicted classification result and child annotation information, and obtaining a second loss based on the second predicted classification result and state annotation information;
performing weighted summation on the first loss and the second loss to obtain a network loss; and adjusting parameters of the feature extraction branch and the at least two classification branches based on the network loss.

2. The method according to claim 1, further comprising:
in response to the first classification result indicating that the person in the at least one image frame is a child, determining whether the second classification result satisfies a predetermined condition; and
in response to the second classification result satisfying the predetermined condition, outputting prompt information.

3. The method according to claim 1, wherein the at least one state of the person comprises at least one of the following: a normal state, an abnormal state, a sleep state, a wake-up state, or a state of leaving a child seat; and
the second classification result comprises at least one of the following: whether the at least one state of the person is the normal state, whether the at least one state of the person is the abnormal state, whether the at least one state of the person is the sleep state, whether at least one the state of the person is the wake-up state, or whether the at least one state of the person is the state of leaving the child seat.

4. The method according to claim 3, wherein the abnormal state comprises at least one of the following: a crying state, irritable state, a vomiting state, a choking state, or a pain state.

5. The method according to claim 2, wherein the predetermined conditions comprises at least one of the following: the at least one state of the person is an abnormal state, the at least one state of the person is a wake-up state, or the at least one state of the person is a state of leaving a child seat.

6. The method according to claim 1, wherein the at least one state of the person comprises at least one face state of the person, and before outputting the first classification result and the second classification result, the method further comprises:
performing statistics on classification results of the at least one face state of the person in the at least one image frame in the obtained video stream by using a statistical classification branch connected to the at least two classification branches in the neural network, and determining the classification of the at least one state of the person based on a statistical result.

7. The method according to claim 6, wherein the at least one face state of the person comprises at least one of the following: an eye open state or an eye closed state.

8. The method according to claim 1, wherein before performing face feature extraction on the at least one image frame in the obtained video stream, the method further comprises:
training the neural network by using the sample image which is provided with the child annotation information and the state annotation information.

9. The method according to claim 8, wherein the child annotation information is used to indicate whether the person in the sample image is a child; in response to an age or estimated age of the person in the sample image being greater than an age or estimated age of a person in a reference image, the child annotation information of the sample image is used to indicate that the person in the sample image is not a child; and in response to the age or estimated age of the person in the sample image being less than or equal to the age or estimated age of the person in the reference image, the child annotation information of the sample image is used to indicate that the person in the sample image is a child.

10. The method according to claim 9, wherein the reference image comprises a boy reference image and a girl reference image.

11. The method according to claim 2, further comprising:
displaying at least one piece of the following information by using at least one of a vehicle-mounted device or a terminal device: the obtained video stream, the first classification result, the second classification result, or the prompt information.

12. The method according to claim 1, wherein before performing face feature extraction on the at least one image frame in the obtained video stream, the method further comprises:
obtaining the video stream by using at least one camera provided in a vehicle.

13. An apparatus for child state analysis, comprising:
a processor; and
a memory configured to store instructions executable by the processor,
wherein the processor, upon execution of the instructions, is configured to:
perform face feature extraction on at least one image frame in an obtained video stream by using a feature extraction branch of a neural network;
respectively determine whether a person in the at least one image frame is a child and classification of at least one state of the person based on face features extracted by the feature extraction branch by using at least two classification branches connected to the feature extraction branch in the neural network; and
output a first classification result and a second classification result, wherein
a classification branch of the at least two classification branches for determining whether the person in the at least one image frame is a child is pre-trained based on annotation data for children of distinguishing genders, and the processor, upon execution of the instructions, is further configured to:
perform face feature extraction on a sample image by using the feature extraction branch;
classify whether a person in the sample image is a child and at least one state of the person in the sample image by sharing the extracted face features by the at least two classification branches, to obtain a first predicted classification result of whether the person in the sample image is a child and a second predicted classification result of the at least one state of the person in the sample image;
obtain a first loss based on the first predicted classification result and child annotation information, and obtain a second loss based on the second predicted classification result and state annotation information;
perform weighted summation on the first loss and the second loss to obtain a network loss; and
adjust parameters of the feature extraction branch and the at least two classification branches based on the network loss.

14. A vehicle, comprising: the apparatus for child state analysis according to claim 13.

15. A non-transitory computer storage medium, configured to store computer readable instructions that, when being executed by a computer, cause the computer to implement the following method:

performing face feature extraction on at least one image frame in an obtained video stream by using a feature extraction branch of a neural network;

respectively determining whether a person in the at least one image frame is a child and classification of at least one state of the person based on face features extracted by the feature extraction branch by using at least two classification branches connected to the feature extraction branch in the neural network; and outputting a first classification result and a second classification result, wherein a classification branch of the at least two classification branches for determining whether the person in the at least one image frame is a child is pre-trained based on annotation data for children of distinguishing genders, and the pre-training comprises:

performing face feature extraction on a sample image by using the feature extraction branch;

classifying whether a person in the sample image is a child and at least one state of the person in the sample image by sharing the extracted face features by the at least two classification branches, to obtain a first predicted classification result of whether the person in the sample image is a child and a second predicted classification result of the at least one state of the person in the sample image;

obtaining a first loss based on the first predicted classification result and child annotation information, and obtaining a second loss based on the second predicted classification result and state annotation information;

performing weighted summation on the first loss and the second loss to obtain a network loss; and adjusting parameters of the feature extraction branch and the at least two classification branches based on the network loss.

16. The method according to claim 4, wherein in response to the second classification result satisfying that the at least one state of the person is the abnormal state, outputting prompt information, comprises:

in response to at least one of the following conditions: the person being in the crying state for a first preset duration, the person being in the irritable state for a second preset duration, or the person being in the pain state for a third preset duration, outputting the prompt information.

* * * * *